United States Patent [19]

Bening

[11] Patent Number: 4,491,209
[45] Date of Patent: Jan. 1, 1985

[54] BRAKE AND TRANSMISSION INTERLOCK SYSTEM

[75] Inventor: Curtis R. Bening, Burnett, Wis.

[73] Assignee: Deere & Company, Moline, Ill.

[21] Appl. No.: 412,464

[22] Filed: Aug. 30, 1982

[51] Int. Cl.³ .............................................. B60K 41/28
[52] U.S. Cl. .............................. 192/4 A; 192/13 R; 74/480 R; 74/483 R
[58] Field of Search ............... 192/4 A, 4 C, 13 R; 74/481 R, 480 A, 479, 483 R; 180/271

[56] References Cited

U.S. PATENT DOCUMENTS

| | | | |
|---|---|---|---|
| 3,262,525 | 7/1966 | Ehlke et al. | 192/13 R |
| 3,511,105 | 5/1970 | Matter | 74/481 |
| 3,525,266 | 8/1970 | Brooks et al. | 74/481 |
| 3,710,904 | 1/1973 | Boyer et al. | 192/4 A |
| 3,797,619 | 3/1974 | Suzuki | 192/13 R |
| 3,868,003 | 2/1975 | Smith | 74/481 |
| 3,935,932 | 2/1976 | Moorhouse | 192/13 R |

Primary Examiner—George H. Krizmanich

[57] ABSTRACT

The vehicle brake and transmission interlock system employs a right hand brake actuator and a left hand brake actuator tied to a cam plate having a formed opening, transmission control link has one end confined within the opening. Actuation of either the right or left hand brake actuator causes the cam plate to displace in a manner confining the travel distance of the transmission control rod which is tied into the transmission control system, thereby limited the output capabilities of the transmission. Full actuation of both the right hand and left hand brake actuator causes the transmission control rod to seat in the cam plate opening corresponding to a neutral transmission state.

4 Claims, 4 Drawing Figures

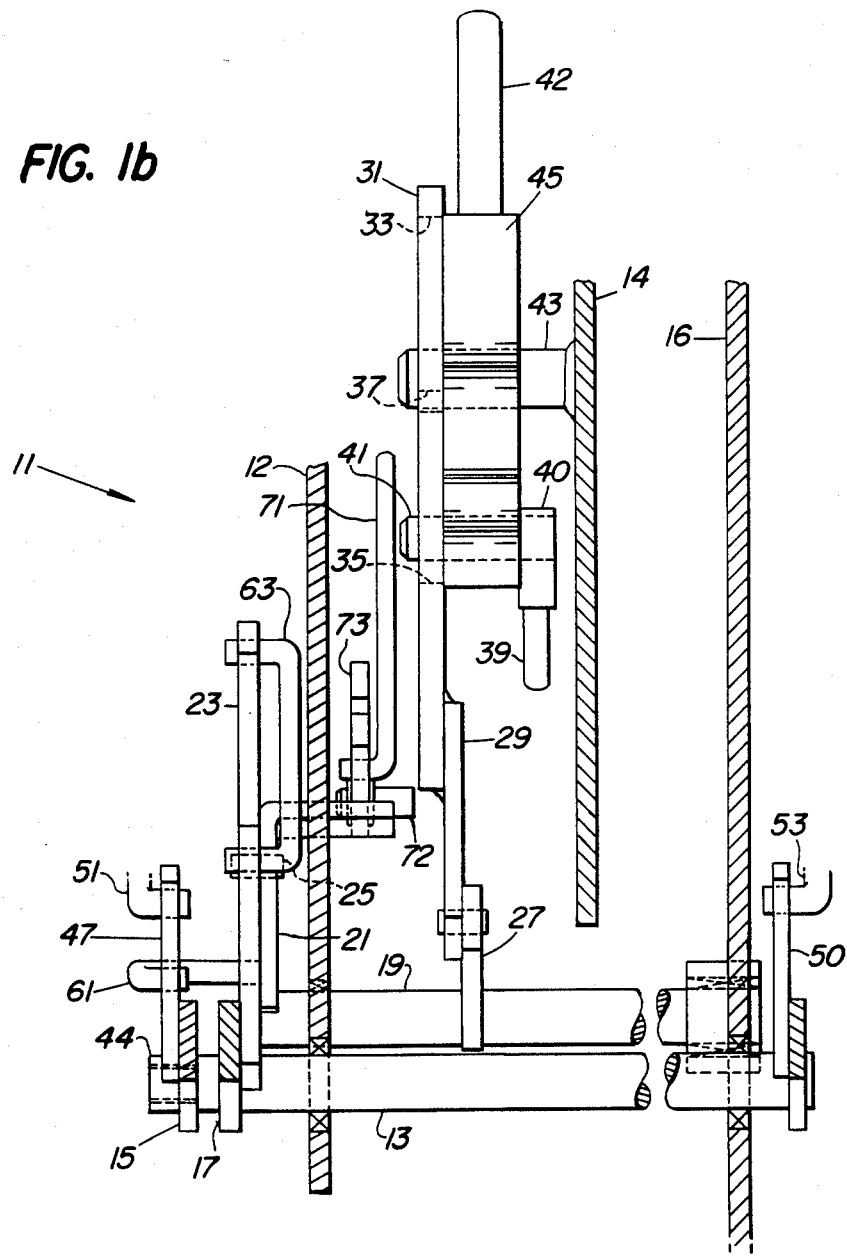

4,491,209

BRAKE AND TRANSMISSION INTERLOCK SYSTEM

BACKGROUND OF THE INVENTION

This invention relates to off-road vehicles having brake assisted steering such as farm tractors.

It is customary to provide on some off road vehicles such as farm tractors the capability for brake assisted steering which improves the maneuverability of the tractor. The tractor is provided with a segregated braking system for independent brake actuation associated with the rear wheel to either side of the vehicle. However, when the tractor is operated under non-field conditions, at a relatively high rate of speed, a destabilizing condition can be presented should the operator attempt to employ brake assisted steering. To improve stability under non-field conditions, some manufactures provide a pedal interlock or a third pedal and associated systems for coordinated brake actuation. However, the use of these systems has not proven totally satisfactory.

SUMMARY OF THE INVENTION

It is an objective of the present invention to present a brake transmission interlock system for an off-road vehicle which in response to independent brake actuation reduces the output capability of the vehicle's transmission and thereby reducing the vehicle speed. It is a further objective of the present invention to present a brake-transmission interlock system which can be used in conjunction with a brake pedal interlock or a braking system employing a third brake pedal.

Right and left brake actuation pedals are rotably mounted in a vehicle, such as a farm tractor, and are coupled to the vehicle's braking system for the selective application of braking loads to the respective right or left rear wheels of the tractor. The brake actuation pedals have fixably mounted to them respective linking amrs which communicate with a pivot link. A means is also provided to communicate the respective brake pedals to the braking system. The pivot link is pivotably supported on a first linking arm. The first linking arm is fixably mounted to a secondary shaft rotably mounted in the vehicle. A second linking arm is fixably mounted to the secondary shaft and is also pivotably mounted to a cam plate assembly. The cam plate assembly is mounted in the vehicle such that it can experience limited motion. The cam plate assembly contains a generally triangular shaped opening where a control link has one end confined within the triangular opening. The control link is in servo communication with the vehicle's hydrostatic transmission control system.

Actuation of either brake pedal causes the pivot link to displace in a manner causing the first and second linking arm to displace in a generally arced pattern. In response to the displacement of the second linking arm, the cam plate is displaced in a manner limiting the permissible linear travel distance within the opening of the control link and, thereby, restricting the output capability of the transmission. Full actuation of both brake pedals results in the control link being seated within the opening in a position corresponding to a neutral transmission setting.

BRIEF DESCRIPTION OF THE DRAWINGS

FIG. 1b is a frontal elevated schematic view of the first shaft with mounted brake pedals.

DESCRIPTION OF THE PREFERRED EMBODIMENT

Figure 1A:
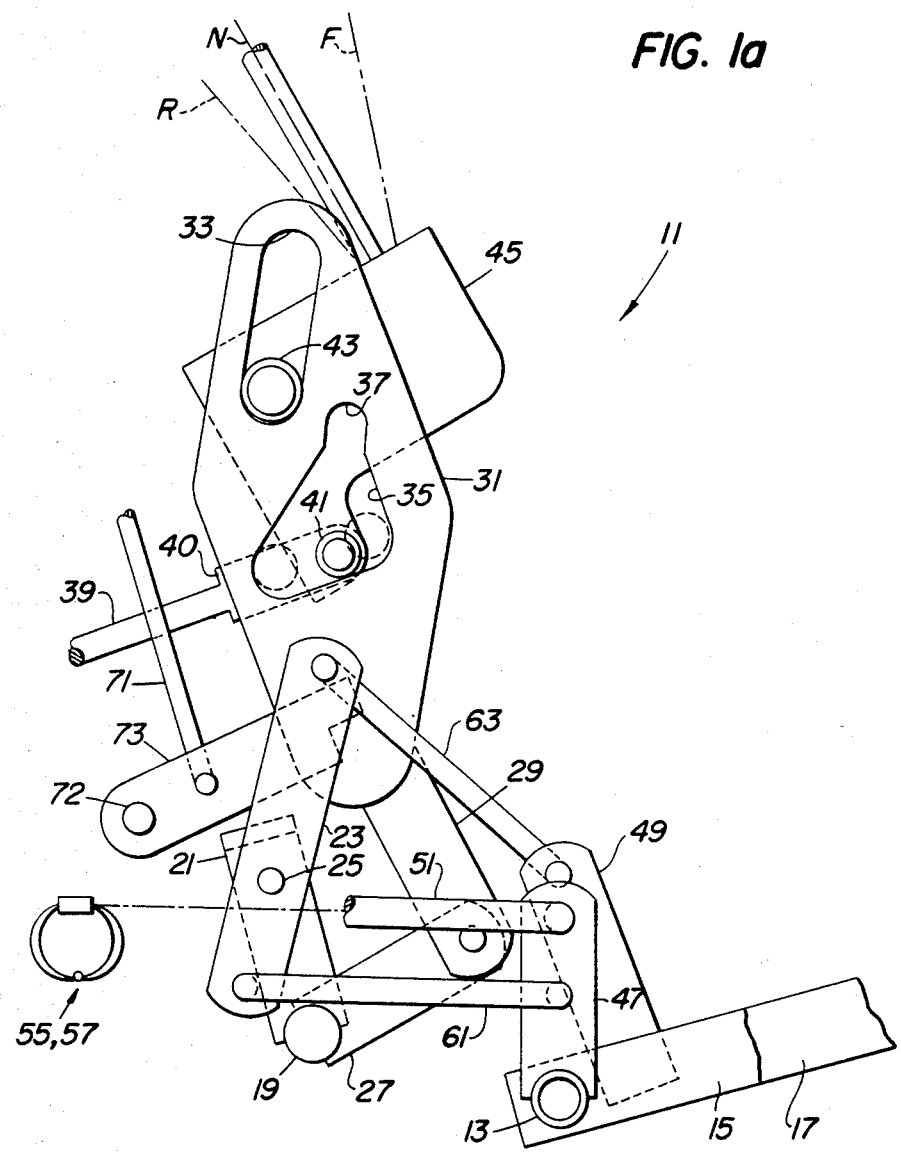
FIG. 1a is a side elevated schematic view of a brake transmission interlock system in accordance with the present invention.

Referring to FIGS. 1a and 1b, a vehicle such as farm or garden tractor (not shown) includes a brake and hydrostatic transmission interlock system, generally indicated as 11, which includes a brake pedal shaft 13 rotably mounted in the vehicle by any conventional means to extend through opposite frame walls 12 and 16. Pivotably mounted to the brake pedal shaft 13 outward of and adjacent to wall 12 is a right brake lever 15. A left brake lever 17 is fixably mounted by any conventional means to shaft 13 between brake lever 15 and wall 12. The designation of right and left brake lever refers to the brake lever for actuating the braking system to apply a braking load to the corresponding wheels on the right or left side of the vehicle. A second shaft 19 is rotably mounted to frame walls 12 and 16 by any conventional means and has fixably mounted thereto by any conventional means a first linking arm 21. A pivot link 23 is pivotably mounted by any conventional means to the first linking member 21 at 25. A second linking member 27 is fixably mounted to the secondary shaft 19 by any conventional means and has pivotably mounted to it by any conventional means at one end a third linking member 29.

A sliding cam plate 31, which is fixably mounted by any conventional means along its lower portion to the third linking arm 29, has a angled vertical slot 33 and a generally triangular shaped opening 35 with a seat 37 located in the upper portion of the triangular shaped opening 35. A transmission control link 39 at one end has a member 40 fixably mounted thereto by any conventional means. A cam pin 41 is fixably mounted by any means in the member 40. Pin 41 extends transversely from member 40 through a member 45 and into the triangular opening 35. The pin 41 is rotatable within member 45. A third shaft 43 extends through and is rotatable within member 45 and one end of shaft 43 is received in slot 33. The other end of shaft 43 is fixably mounted by any conventional means to a mounting plate 14. The mounting plate 14 is located inward of wall 12 and is mounted to wall 12 or other location of the vehicle at any convenient point. A transmission control rod 42 is fixably mounted to by any conventional means to member 45. The transmission control rod 42 is positionable through the range of full speed reverse, designated as "R", to full speed forward, designated as "F", passing through neutral, designated as "N". The shaft 43 restricts the motion of cam plate 31 to an angled vertical movement.

Each brake lever 15 and 17 has a respective linking arm 47 and 49 fixably mounted thereto by any conventional means such as by welding. To communicate the motion of the brake pedal levers 15 to the pivot link 23, a brake connecting rod 61 is pivotably mounted in and extends from the linking arm 47, at one end, to the lower end of the pivot link 23 at the other end of rods 61. In like manner to rod 61, a second connecting rod 63 extends from the arm 49 to the upper end of the pivot link 23. The rods 61 and 63 are pivotally mounted at the ends by any conventional means. Linking arm 47 has one end of a brake actuation rod 51 pivotably mounted thereto by any conventional means. The other end of rod 51 communicates with a conventional braking system for instigation of brake 55 (indicated in phantom) on right side of the vehicle. A linking arm 50 is fixably mounted to shaft 13 by any conventional means and has one end of a brake actuation rod 53 pivotably mounted to arms 50 by any conventional means. The other end of rod 53 communicates with a conventional braking system for instigation of a brake 57 on the other side of the vehicle (indicated in phantom).

Figure 2:
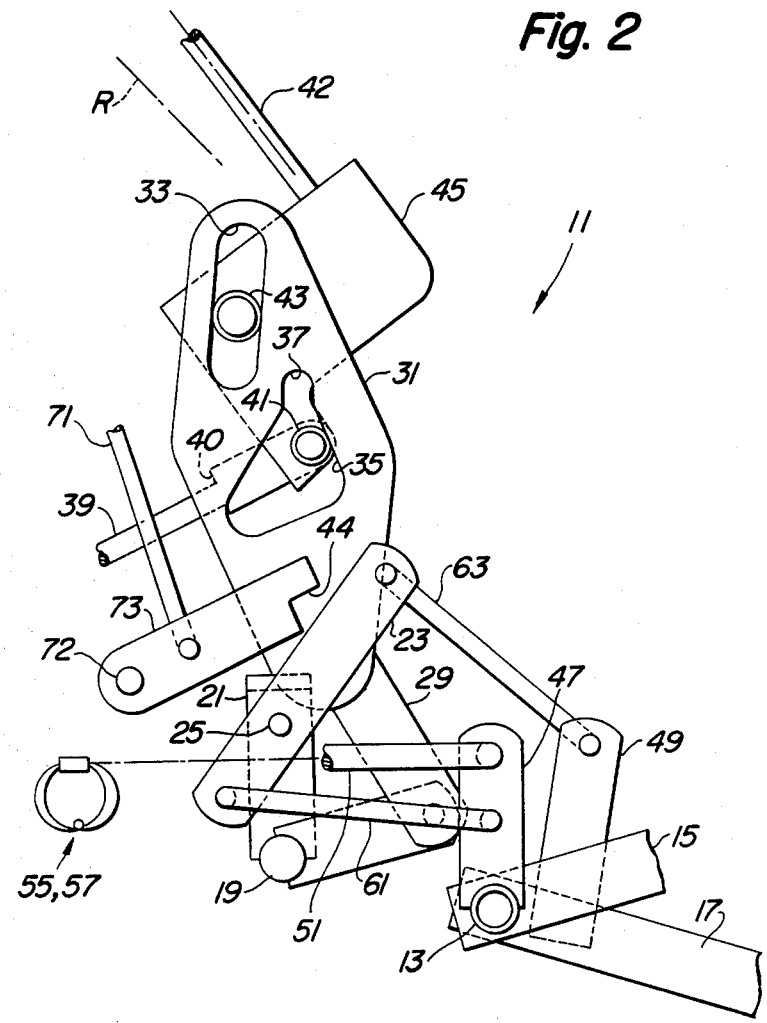
FIG. 2 is a schematic view of the brake transmission interlock system in a left hand brake applied condition.
Figure 3:
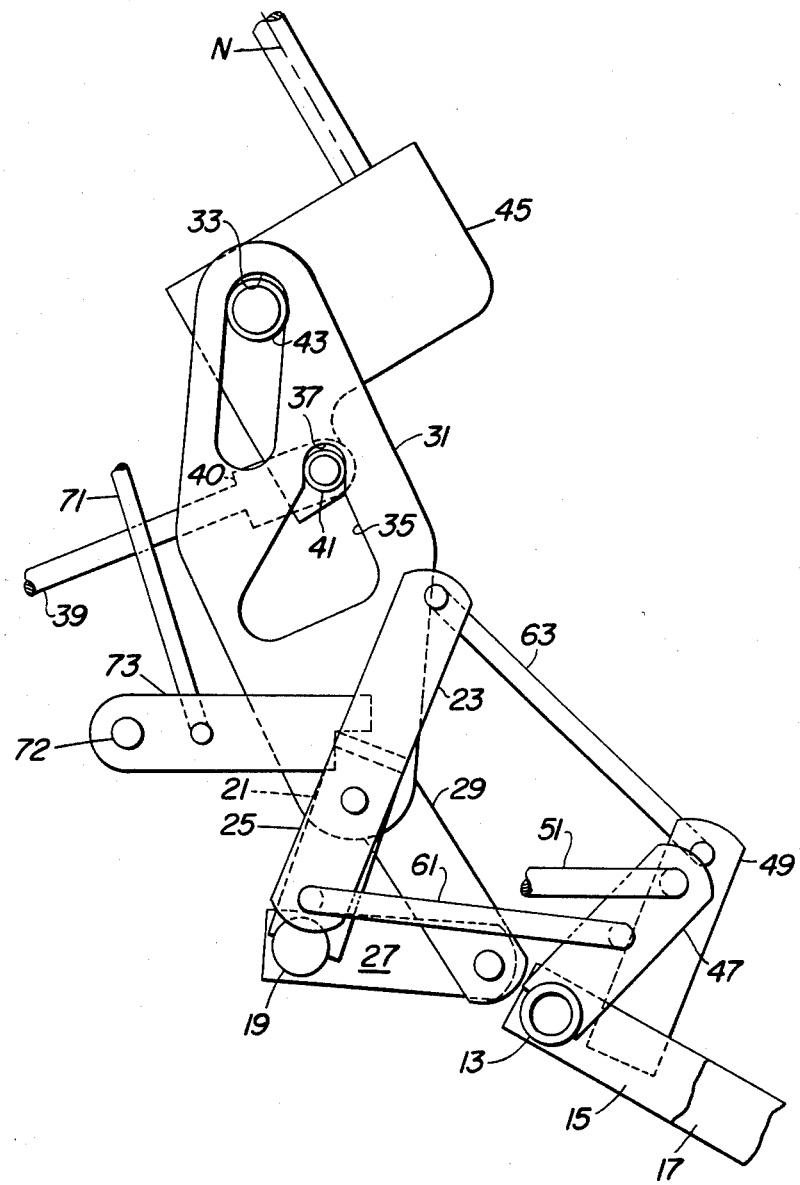
FIG. 3 is a schematic of the transmission brake interlock system in a full brake applied condition.

Referring more particularly to FIGS. 2 and 3, in the preferred embodiment, the control rod 39 communicates with the speed and directional control linkage of the hydrostatic transmission in any conventional manner which causes the pin 41 to displace in a generally linear manner within the confines of the triangular opening 35 in proportion to the displacement of the transmission. It is observed that actuation of either of the brake pedal levers 15 or 17 causes the corresponding connecting rods 61 or 63 to act upon the pivot link 23, resulting in the first linking member 21 displacing in response thereto. The displacement of pivot link 21 produces a corresponding displacement of the second linking member 27 which acts upon the cam plate 31 through link 29 causing the cam plate 31 to displace downwardly. Displacement of cam plate 31 results in the longitudinal travel distance of the cam pin 41 within the opening 35 by the walls of the opening 35. Therefore, by reducing the travel distance of a pin 41, the maximum displacement of the transmission control linkage is reduced resulting in reducing the maximum output of the vehicle's transmission (i.e. reduces the maximum vehicle speed capability under the braking condition). Should both brake pedals 15 and 17 be fully actuated, the corresponding rods 61 and 63 act upon pivot link 23 simultaneously to pivot link 21 producing corresponding displacement of linking member 27 which acts upon link 29 to fully displace cam plate 31 causing the cam pin 41 seats in seat 37 corresponding to a neutral transmission output. When the vehicle is parked, both pedals 15 and 17 are fully depressed to allow a latch 73 pivotally mounted to a shaft 72 to be pivoted by rod 71 onto link 21 seating a portion of link 21 in seat 44 of latch 73 locking link 21 which places the transmission in neutral and locks the brakes on. Rod 71 extends from the operator's station (not shown) to latch 73.

The aforedescribed invention has been described in a manner particular to a vehicle employing a hydrostatic transmission. However, it is appreciated that the application of the interlock system is broader than the aforedescribed preferred embodiment. Therefore, the invention should in no way be limited by the aforedescription preferred embodiment. The full scope of defined by the appendix claims.

I claim:

1. A vehicle brake and transmission interlock system for vehicles which employ brake assisted steering, comprising:
   (a) a right brake actuation means for causing actuation of and said vehicle's braking system on the right side of the vehicle;
   (b) a left brake actuation means for causing actuation of said vehicle's braking system on the left side of the vehicle;
   (c) a transmission control link means for communicating with the transmission of the vehicle and responding in a predetermined manner in relationship to the output of the transmission, and being capable of altering the output of the transmission;
   (d) response means in communicating with said right and left brake actuation means and said transmission control link means for responding selectively to actuation of said brake actuation means and effecting said transmission control link means such that the output of said transmission cannot exceed a predetermined amount, including:
   i a shaft rotatable mounted in the vehicle;
   ii a first linking member fixably mounted to said shaft;
   iii a pivot link pivotably mounted to said first linking member at a point along said pivot link;
   iv a second linking member fixably mounted to said shaft;
   v a third linking member pivotably mounted to said second linking member;
   vi a sliding cam plate fixably mounted to said third link said cam plate having a generally triangular shape opening including a neutral seat portion;
   vii guide means for restricting and defining motion of said cam plate;
   viii said transmission control link means including a cam pin confined in such opening of said cam plate to limit generally linear displacement of said cam pin therein;
   ix linkage means for communicating with said left and right brake actuation means to said pivot means such that selective actuation of said actuation means causes said pivot link to displace said cam plate such that the displacement range of said cam pin is reduced by said opening and joint actuation of said actuation mean causes said cam pin to set in said seat portion.

2. A vehicle brake and transmission interlock system for vehicles which employ brake assisted steering, comprising:
   (a) a first shaft (13) rotatably mounted in said vehicle;
   (b) a first brake pedal lever (17) fixably to said first shaft (13);
   (c) a first linking arm (49) fixably mounted to said first shaft (13);
   (d) a second brake shaft (44) pivotably mounted about said first shaft (13);
   (e) a second linking arm (47) fixably mounted to said second brake shaft (44);
   (f) a second shaft (19) rotatable mounted in said vehicle and having a first linking member (21) and a second linking member (27) fixably mounted to said shaft (19) and extending generally perpendicular therefrom, said linking members (21 and 27) aligned in an angled orientation to one another;
   (g) a pivot link (23) pivotably mounted to said first linking member (21);
   (h) a first connecting rod (61) pivotably mounted to one end of said pivot linke (23) and to aid second linking arm (47);
   (i) a second connecting rod (63) pivotably mounted to the other end of said pivot linke (23) and to said first linking arm (49);

(j) a cam plate (31) having a generally triangular shaped opening (35) with a seat (37) pivotably mounted to said second linking member (27);

(k) control link 39 having a transverse member (41) at one end, said transverse member (41) being confined in such opening (35), said control link (39) in servo communication with said vehicle's transmission such that said transverse member (41) response to the output of said transmission by experiencing linear motion;

(l) guide means for restriction of the motion of said cam plate (31) in a manner transverse to said transverse member (41);

whereby rotational motion of either or both of said first or second brake pedal lever (15 or 17) causes said cam plate (31) to displace to restrict the linear range of said transverse member (41) with said opening (35).

3. An interlock system as claimed in claim 2, whereby said guide comprises said cam plate have a slot (33) therethrough and a shaft (43) extending transversely through said slot and rotatable mounted in said vehicle.

4. An interlock system as claimed in claim 3, further comprising a latch means (71, 72, 73) for locking said brake pedal levers (15 and 17) in a position to set said pin (41) in said seat (37).

* * * * *